United States Patent [19]

Cseh et al.

[11] 4,062,838

[45] Dec. 13, 1977

[54] DISAZO PIGMENTS CONTAINING ACYLAMINO GROUPS

[75] Inventors: Georg Cseh, Arlesheim; Stefan Hari, Allschwil, both of Switzerland

[73] Assignee: Ciba-Geigy Corporation, Ardsley, N.Y.

[21] Appl. No.: 686,431

[22] Filed: May 14, 1976

Related U.S. Application Data

[63] Continuation-in-part of Ser. No. 575,105, May 6, 1975, abandoned.

[30] Foreign Application Priority Data

May 9, 1974 Switzerland .................. 6373/74

[51] Int. Cl.² ............................................. C09B 33/14
[52] U.S. Cl. ..................... 260/176; 260/140; 260/152; 260/208; 106/288 Q
[58] Field of Search ......................................... 260/176

[56] References Cited

U.S. PATENT DOCUMENTS

| | | | |
|---|---|---|---|
| 1,505,568 | 8/1924 | Laska et al. ................ | 260/176 X |
| 2,515,546 | 7/1950 | Bossard et al. .............. | 260/176 |
| 2,936,306 | 5/1960 | Schmid et al. .............. | 260/176 |
| 3,627,750 | 12/1971 | Ronco et al. ................ | 260/176 |
| 3,900,459 | 8/1975 | Kawamura et al. .......... | 260/176 X |
| 3,928,314 | 12/1975 | Rochat et al. ............... | 260/176 X |

FOREIGN PATENT DOCUMENTS

| | | | |
|---|---|---|---|
| 1,066,769 | 4/1967 | United Kingdom .................. | 260/176 |
| 210,217 | 1/1924 | United Kingdom .................. | 260/176 |

*Primary Examiner*—Charles F. Warren
*Attorney, Agent, or Firm*—Vincent J. Cavalieri

[57] ABSTRACT

Disazo pigments of the formula

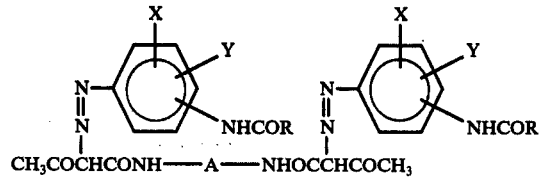

wherein A denotes a phenylene or naphthylene radical, R denotes an aryl, alkyl or alkenyl group optionally substituted by halogen atoms, by hydroxyl, alkoxy or alkylmercapto groups containing 1-6 C atoms, by alkoxycarbonyl groups containing 2-6 C atoms or cyano, aryl, aryloxy, arylmercapto or heterocyclic radicals, or denotes a heterocyclic radical, and the X and Y denote H atoms or substituents which do not confer solubility in water are useful for coloring plastics lacquers and printing inks in yellow to orange shade of good fastness properties.

6 Claims, No Drawings

DISAZO PIGMENTS CONTAINING ACYLAMINO GROUPS

This is a continuation-in-part of our copending application Ser. No. 575,105, filed May 6, 1975 now abandoned.

It has been found that new, valuable disazo pigments of the formula

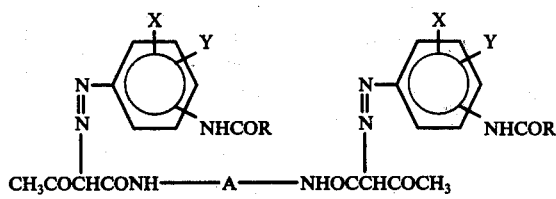

wherein A denotes a phenylene or naphthylene radical, R denotes an aryl, alkyl or alkenyl group optionally substituted by halogen atoms, by hydroxyl, alkoxy or alkylmercapto groups containing 1 - 6 C atoms, by alkoxycarbonyl groups containing 2 - 6 C atoms or cyano, aryl, aryloxy, arylmercapto or heterocyclic radicals, or denotes a heterocyclic radical and the X and Y denote H atoms or substituents which do not confer solubility in water, are obtained when a diazo or diazoamino compound of an amine of the formula

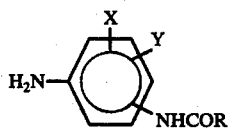

is coupled with a bis-acetoacetyl-arylenediamine of the formula $$CH_3COCH_2CONH—A—NHOCCH_2COCH_3$$

in the molar ratio of 2:1.

Pigments of particular interest are those of the formula (I), wherein the NHCOR group is in the para-position to the azo group, and/or wherein R denotes an alkyl group, containing 1 - 6 C atoms, or a phenyl group optionally substituted by halogen atoms, hydroxyl groups or alkyl or alkoxy groups containing 1 - 4 C atoms and wherein X denotes a H atom, an alkyl or alkoxy group containing 1 - 4 C atoms, a nitro or cyano group or an alkoxycarbonyl group, containing 2 - 5 C atoms, and Y denotes a H or halogen atom or an alkyl or alkoxy group containing 1 - 4 C atoms.

A in the formula (I) preferably represents a radical of the formula

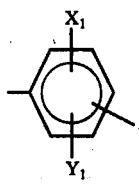

wherein $X_1$ and $Y_1$ denote H or halogen atoms, alkyl or alkoxy groups containing 1 - 4 C atoms, phenoxy, trifluoromethyl, nitro or cyano groups, or alkoxycarbonyl or alkanoylamino groups containing 2 - 5 C atoms, and especially a radical of the formula

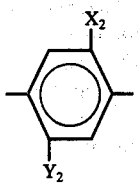

wherein $X_2$ and $Y_2$ denote H or chloride atoms or alkyl or alkoxy groups containing 1 - 4 C atoms.

Diazo components used are preferably those of the formula (II), wherein R denotes an alkyl group containing 1 - 6 C atoms, or a phenyl group optionally substituted by halogen atoms, hydroxyl groups, alkyl or alkoxy groups containing 1 - 4 C atoms or alkoxycarbonyl groups containing 1 - 4 C atoms, and wherein X denotes a H atom, an alkyl or alkoxy group containing 1 - 4 C atoms, a nitro or cyano group or an alkoxycarbonyl group containing 2 - 5 C atoms and Y denotes a H or halogen atom or an alkyl or alkoxy group containing 1 - 4 C atoms.

The following may be mentioned as examples of diazo components: 1-amino-3-acetylamino-benzene, 1-amino-2-chloro-5-acetylamino-benzene, 1-amino-2-methyl-5-acetylamino-benzene, 1-amino-2-methoxy-5-acetylamino-benzene, 1-amino-4-methyl-5-acetylamino-benzene, 1-amino-4-methoxy-5-acetylamino-benzene, 1-amino-2-ethoxy-5-acetylamino-benzene, 1-amino-2-methoxy-5-propionylamino-benzene, 1-amino-2-chloro-5-propionylamino-benzene, 1-amino-2-methyl-5-butyrylamino-benzene, 1-amino-4-acetylamino-benzene, 1-amino-2-chloro-4-acetylamino-benzene, 1-amino-2-methyl-4-acetylamino-benzene, 1-amino-2-methoxy-4-acetylamino-benzene, 1-amino-2-nitro-4-acetylamino-benzene, 1-amino-3-chloro-4-acetylamino-benzene, 1-amino-3-methoxy-4-acetylamino-benzene, 1-amino-3-cyano-4-acetylamino-benzene, 1-amino-3-methyl-4-acetylamino-benzene, 1-amino-2-chloro-4-propionylamino-benzene, 1-amino-2-methyl-4-butyrylamino-benzene, 1-amino-2-methoxy-3-acetylamino-benzene, 1-amino-2-chloro-3-acetylamino-benzene, 1-amino-2,5-dichloro-4-acetylamino-benzene, 1-amino-2,5-dimethyl-4-acetylamino-benzene, 1-amino-2,5-dimethoxy-4-acetylamino-benzene, 1-amino-2,5-diethoxy-4-acetylamino-benzene, 1-amino-3,5-dichloro-4-acetylamino-benzene, 1-amino-2-methyl-5-chloro-4-acetylamino-benzene, 1-amino-2-chloro-5-methyl-4-acetylamino-benzene, 1-amino-2-methoxy-5-chloro-4-acetylamino-benzene, 1-amino-2-methoxy-5-methyl-4-acetylamino-benzene, 1-amino-2-methoxy-5-nitro-4-acetylamino-benzene, 1-amino-2-methoxy-5-chloro-4-propionylamino-benzene, 1-amino-2-chloro-4-methyl-5-acetylamino-benzene, 1-amino-2-acetylamino-benzene, 1-amino-2-propionylamino-benzene, 1-amino-5-methyl-2-acetylamino-benzene, 1-amino-5-methoxy-2-acetylamino-benzene, 1-amino-5-trifluoromethyl-2-acetylamino-benzene, 1-amino-5-chloro-2-acetylamino-benzene, 1-amino-4-chloro-2-acetylamino-benzene, 1-amino-4-methyl-2-acetylamino-benzene, 1-amino-4-methoxy-2-acetylamino-benzene, 1-amino-3-chloro-2-acetylamino-benzene, 1-amino-4,5-dichloro-2-acetylamino-benzene, 1-amino-2-chloro-5-methoxy-4-acetylamino-benzene, 1-amino-4-chloro-5-methoxy-2-acetylamino-benzene, 1-amino-2,5-diacetylamino-benzene, 1-amino-2-methoxy-5-benzylaminobenzene, 1-amino-2-methoxy-5-(o-chlorobenzoylamino)-benzene, 1-amino-2-methoxy-5-(p-chlorobenzoylamino)-benzene, 1-amino-2-methoxy-5-(2',4'-dichlorobenzoylamino)-benzene, 1-amino-2-methoxy-5-(2'-thienylamino)-benzene, 1-amino-2-methoxy-5-(2'-furoylamino)-benzene, 1-amino-2-methoxy-4-benzoylamino-benzene, 1-amino-2-methoxy-4-(o-chlorobenzoylamino)-benzene, 1-amino-2-methoxy-4-(p-chlorobenzoylamino)-benzene, 1-amino-2-methoxy-4-(2',4'-dichlorobenzoylamino)-benzene, 1-amino-2-methoxy-4-(o-methylbenzoylamino)-benzene, 1-amino-2-methoxy-4-(p-methylbenzoylamino)-benzene, 1-amino-2-methoxy-4-(o-methoxybenzoylamino)-benzene, 1-amino-2-methoxy-5-(o-methylbenzoylamino)-benzene, 1-amino-2-methoxy-5-(p-methylbenzoylamino)-benzene, 1-amino-2-methoxy-5-(o-methoxybenzoylamino)-benzene, 1-amino-2-methoxy-5-(p-methoxybenzoylamino)-benzene, 1-amino-2-methoxy-3-benzoylaminobenzene, 1-amino-2-methoxy-6-benzoylaminobenzene, 1-amino-2,5-dimethoxy-4-benzoylaminobenzene, 3-amino-4-methoxy-carbanilic acid benzyl ester, 3-amino-4-methoxy-carbanilide, 1-amino-2,5-dimethoxy-4-(o-chlorobenzoylamino)-benzene, 1-amino-2,5-dimethoxy-4-(p-chlorobenzoylamino)-benzene, 1-amino-2,5-dimethoxy-4-(2',4'-dichlorobenzoylamino)-benzene, 1-amino-2,5-dimethoxy-4-(o-methylbenzoylamino)-benzene, 1-amino-2,5-dimethoxy-4-(p-methylbenzoylamino)-benzene, 1-amino-2,5-dimethoxy-3-benzoylaminobenzene, 1-amino-2-methoxy-5-methyl-4-benzoylaminobenzene, 1-amino-2-methoxy-5-methyl-4-(o-chlorobenzoylamino)-benzene, 1-amino-2-methoxy-5-methyl-4-(p-chlorobenzoylamino)-benzene, 1-amino-2-methoxy-5-methyl-4-(2',4'-dichlorobenzoylamino)-benzene, 1-amino-2-methoxy-5-methyl-4-(o-methylbenzoylamino)-benzene, 1-amino-2-methoxy-5-methyl-4-(p-methylbenzoylamino)-benzene, 1-amino-2-methoxy-5-methyl-4-(o-methoxybenzoylamino)-benzene, 1-amino-2-methoxy-5-methyl-4-(2'-thienylamino)-benzene, 1-amino-2-methoxy-5-methyl-4-(2'-furoylamino)-benzene, 1-amino-2-methoxy-5-chloro-4-benzoylaminobenzene, 1-amino-2-methoxy-5-chloro-4-(o-chlorobenzoylamino)-benzene, 1-amino-2-methoxy-5-chloro-4-(p-chlorobenzoylamino)-benzene, 1-amino-2-methoxy-5-chloro-4-(2',4'-dichlorobenzoylamino)-benzene, 1-amino-2-methoxy-5-chloro-4-(o-methylbenzoylamino)-benzene, 1-amino-2-methoxy-5-chloro-4-(p-methylbenzoylamino)-benzene, 1-amino-2-methoxy-5-chloro-4-(o-methoxybenzoylamino)-benzene, 1-amino-2-methoxy-5-chloro-4-(2'-thienylamino)-benzene, 1-amino-2-methoxy-5-chloro-4-(2'-furoylamino)-benzene, 1-amino-2-methoxy-5-nitro-4-benzoylaminobenzene, 1-amino-2-methoxy-5-nitro-4-(o-chlorobenzoylamino)-benzene, 1-amino-2-methoxy-4-phenacetylaminobenzene, 1-amino-2-methoxy-5-phenacetylaminobenzene, 1-amino-2-methoxy-3-pheneacetylaminobenzene, 1-amino-2,5-dimethoxy-4-phenacetylaminobenzene, 1-amino-2-methoxy-3-methyl-4-phenacetylaminobenzene, 1-amino-2-methoxy-5-chloro-4-phenacetylaminobenzene, 1-amino-2-methoxy-5-naphthylacetylaminobenzene, 1-amino-2-methoxy-5-phenoxyacetylaminobenzene, 1-amino-2-methoxy-5-(p-chlorophenoxyacetylamino)-benzene, 1-amino-2-methoxy-5-phenylthioacetyl-aminobenzene, 1-amino-2-methoxy-4-phenylthioacetylaminobenzene, 1-amino-2,5-dimethoxy-4-phenylthioacetylaminobenzene, 1-amino-2-methoxy-5-methyl-4-phenylthioacetylaminobenzene, 1-amino-2-methoxy-5-chloro-4-phenylthioacetylaminobenzene, 1-amino-2,5-diethoxy-4-(2',4'-dichlorophenylthioacetylamino)-benzene, 1-amino-2-ethoxy-5-benzoylaminobenzene, 1-amino-2-ethoxy-5-(o-chlorobenzoylamino)-benzene, 1-amino-2-ethoxy-5-(p-chlorobenzoylamino)-benzene, 1-amino-2-ethoxy-5-(2',4'-dichlorobenzoylamino)-benzene, 1-amino-2-ethoxy-4-(o-chlorobenzoylamino)-benzene, 1-amino-2-ethoxy-4-(p-chlorobenzoylamino)-benzene, 1-amino-2-ethoxy-4-(2',4'-dichlorobenzoyl-amino)-benzene, 1-amino-2-ethoxy-5-(o-methylbenzoylamino)-benzene, 1-amino-2-ethoxy-5-(p-methylbenzoylamino)-benzene, 1-amino-2-ethoxy-4-(o-methylbenzoylamino)-benzene, 1-amino-2-ethoxy-4-(p-methylbenzoylamino)-benzene, 1-amino-2-ethoxy-5-(o-methoxybenzoylamino)-benzene, 1-amino-2-ethoxy-4-(o-methoxybenzoylamino)-benzene, 1-amino-2,5-diethoxy-4-benzoylaminobenzene, 1-amino-2,5-diethoxy-4-(o-chlorobenzoylamino)-benzene, 1-amino-2,5-diethoxy-4-(p-chlorobenzoylamino)-benzene, 1-amino-2,5-diethoxy-4-(2',4'-dichlorobenzoylamino)-benzene, 1amino-2,5-diethoxy-4-(o-methylbenzoylamino)-benzene, 1-amino-2,5-diethoxy-4-(p-methylbenzoylamino)-benzene, 1-amino-2,5-diethoxy-4-(o-methoxybenzoylamino)-benzene, 1-amino-2-ethoxy-5-methyl-4-benzoylaminobenzene, 1-amino-2-ethoxy-5-chloro-4-benzoylaminobenzene, 1-amino-2-ethoxy-4-phenacetylaminobenzene, 1-amino-2-ethoxy-5-phenacetylaminobenzene, 1-amino-2,5-diethoxy-4-phenacetylaminobenzene, 1-amino-2,5-diethoxy-4-phenylthioacetylaminobenzene, 1-amino-2,5-diethoxy-4-(p-chlorophenoxyacetylamino)-benzene, 1-amino-2,5-diethoxy-4-phenylthioacetylaminobenzene, 1-amino-2-methyl-5-benzoylaminobenzene, 1-amino-2-methyl-4-benzoylaminobenzene, 1-amino-2,5-dimethyl-4-benzoylaminobenzene, 1-amino-2-methyl-5-chloro-4-benzoylaminobenzene, 1-amino-2-methyl-5-phenacetylaminobenzene, 1-amino-2-methyl-4-phenacetylaminobenzene, 1-amino-2-methyl-5-phenoxyacetylaminobenzene, 1-amino-2-methyl-4-phenoxyacetylaminobenzene, 1-amino-2,5-dimethyl-4-phenacetylaminobenzene, 1-amino-2,5-dimethyl-4-phenoxyacetylaminobenzene, 1-amino-2,5-dimethyl-4-(p-chlorophenoxyacetylamino)-benzene, 1-amino-2,5-dimethyl-4-phenylthioacetylaminobenzene, 1-amino-2-chloro-5-benzoylaminobenzene, 1-amino-2-chloro-4-benzoylaminobenzene, 1-amino-2,5-dichloro-4-benzoylaminobenzene, 1-amino-2-chloro-5-methyl-4-benzoylaminobenzene, 1-amino-2-chloro-5-phenacetylaminobenzene, 1-amino-2-chloro-4-phenacetylaminobenzene, 1-amino-2-chloro-5-phenoxyacetylaminobenzene, 1-amino-2-chloro-4-phenoxyacetylaminobenzene, 1-amino-2,5-dichloro-4-phenacetylaminobenzene, 1-amino-2,5-dichloro-4-phenoxyacetylaminobenzene, 1-amino-2,5-dichloro-4-(p-chlorophenoxyacetylamino)-benzene, 1-amino-2,5-dichloro-4-phenylthioacetylaminobenzene, 1-amino-2-nitro-5-benzoylaminobenzene, 1-amino-2-nitro-5-benzoylaminobenzene, 1-amino-2-nitro-4-benzoylaminobenzene, 1-amino-2-nitro-5-methyl-4-benzoylaminobenzene, 1-amino-2-nitro-5-chloro-4-benzoylaminobenzene, 1-amino-2-nitro-4-phenacetylaminobenzene, 1-amino-2-nitro-4-phenoxyacetylaminobenzene, 1-amino-2-nitro-4-(p-chlorophenoxyacetylamino)-benzene, 1-amino-2-nitro-4-phenylthioacetylaminobenzene, 1-amino-2-chloro-5-methyl-4-(3',5'-dichloro-4'-hydroxybenzoylamino)-benzene, 1-amino-2-chloro-5-methyl-4-(3',5'-dibromo-4'-hydroxy-benzoylamino)-benzene, 1-amino-4-(3',5'-dichloro-6'-hydroxy-benzoylamino)-benzene and 1-amino-2,5-dichloro-4-(2'-hydroxy-benzoylamino)-benzene.

The diazo components mentioned are known compounds.

Coupling components used are preferably those of the formula

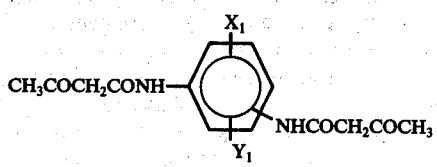

wherein $X_1$ and $Y_1$ have the indicated meaning, and especially those of the formula

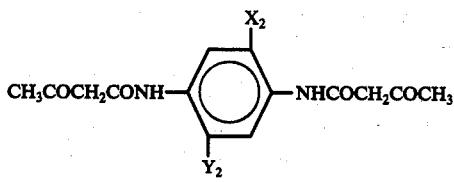

wherein $X_2$ and $Y_2$ have the indicated meaning.

These are known compounds which are obtained by the action of diketene or acetoacetic acid esters on the corresponding phenylenediamines such as, for example: 1,4-phenylenediamine, 2-chloro-1,4-phenylenediamine, 2-methyl-1,4-phenylenediamine, 2-methoxy-1,4-phenylenediamine, 2-ethoxy-1,4-phenylenediamine, 2-phenoxy-1,4-phenylenediamine, 2-aminocarbonyl-1,4-phenylenediamine, 2-methoxycarbonyl-1,4-phenylenediamine, 2,3-dichloro-1,4-phenylenediamine, 2,5-dichloro-1,4-phenylenediamine, 2,6-dichloro-1,4-phenylenediamine, 2-chloro-5-methyl-1,4-phenylenediamine, 2-chloro-5-methoxy-1,4-phenylenediamine, 2,5-dimethyl-1,4-phenylenediamine, 2-methyl-5-methoxy-1,4-phenylenediamine, 2,5-dimethoxy-1,4-phenylenediamine, 2,5-diethoxy-1,4-phenylenediamine, 2,3,5-trichloro-1,4-phenylenediamine, 2,3,5,6-tetrachloro-1,4-phenylenediamine, 2,3,5,6-tetramethyl-1,4-phenylenediamine, 2,5-dimethyl-3,6-dichloro-1,4-phenylenediamine, 1,3-phenylenediamine, 4-chloro-1,3-phenylenediamine, 2-methyl-1,3-phenylenediamine, 4-methyl-1,3-phenylenediamine, 4-methoxy-1,3-phenylenediamine, 2,4-dichloro-1,3-phenylenediamine, 2,5-dichloro-1,3-phenylenediamine, 4,6-dichloro-1,3-phenylenediamine, 4,6-dimethyl-1,3-phenylenediamine, 2,6-dimethyl-1,3-phenylenediamine, 1,4-naphthylenediamine, 1,5-naphthylenediamine and 2,6-naphthylenediamine.

The coupling is preferably carried out in a weakly acid medium, suitably in the presence of customary agents which assist the coupling. As such there may in particular be mentioned dispersing agents, for example aralkylsulphonates, such as dodecylbenzenesulphonate, or 1,1'-dinaphthylmethane-2,2'-disulphonic acid or polycondensation products of alkylene oxides. The dispersion of the coupling component can also advantageously contain protective colloids for example methylcellulose or minor amounts of inert sparingly water-soluble, or water-insoluble, organic solvents, for example optionally halogenated or nitrated aromatic hydrocarbons, such as benzene, toluene, xylene, chlorobenzene, dichlorobenzene or nitrobenzene, as well as aliphatic halogenohydrocarbons, such as, for example, carbon tetrachloride or trichloroethylene, and also water-miscible organic solvents, such as acetone, methyl ethyl ketone, methanol, ethanol or isopropanol.

The coupling can also be advantageously carried out by continuously combining an acid solution of the diazonium salt with an alkaline solution of the coupling component in a mixing nozzle, whereupon immediate coupling of the components takes place. Care must be taken that the diazo components and coupling components are present in equimolecular amounts in the mixing nozzle, a slight excess of the diazo component proving advantageous. This is most simply effected by checking the pH value of the liquid in the mixing nozzle. Vigorous turbulent intermixing of the two solutions in the mixing nozzle must also be ensured. The colorant dispersion produced is continuously withdrawn from the mixing nozzle and the colorant separated off by filtration.

The coupling can also be carried out by heating a diazoamino compound of the amine to be used as the diazo component with the diacetoacetylphenylenediamine in an organic solvent, if appropriate in an aqueous-organic solvent, preferably in the presence of an acid.

The diazoamino compounds to be used according to the process are obtained in accordance with known processes, by coupling a diazonium salt of the amine which serves as the diazo component with a primary or preferably with a secondary amine. The most diverse amines can be used for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid and $\beta$-aminoethylsulphuric acid, cycloaliphatic amines such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalenesulphonic acid, 1-aminonaphthalene-2,4-disulphonic acid, heterocyclic amines such as piperidine, morpholine, pyrrolidine and dihydroindole and finally also sodium cyanamide or dicyandiamide.

As a rule, the diazoamino compounds obtained are sparingly soluble in cold water and can, if necessary after salting out, be isolated in a crystalline form from the reaction medium. In many cases, the moist press cakes can be used for the further reaction. In individual cases it can prove appropriate to dehydrate the diazoamides by vacuum drying prior to the reaction or to remove the water by azeotropic distillation after suspending the moist press cake in a solvent.

The coupling of the diazoamino compounds with the coupling component is then carried out in an organic solvent, for example chlorobenzene, o-dichlorobenzene, nitrobenzene, pyridine, ethylene glycol, ethylene glycol monomethyl ether or monoethyl ether, dimethylformamide, N-methylpyrrolidone, formic acid or acetic acid. When using solvents which are water-miscible it is not necessary to use the diazoamino compound in the anhydrous form. For example, the water-moist filter cakes can be used. The scission of the diazoamino compound which precedes the coupling takes place in an acid medium. If neutral solvents are used, the addition of an acid, for example hydrogen chloride, sulphuric acid, formic acid, acetic acid or chloroacetic acid is necessary.

The coupling is suitably carried out with warming, preferably at temperatures between 80° to 180° C, and in general takes places very rapidly and completely.

By virtue of their insolubility, the pigments obtained can be isolated from the reaction mixtures by filtration. It proves advantageous to carry out an after-treatment of the pigments obtained, with an organic solvent which preferably boils above 100° C. Benzenes substituted by halogen atoms, alkyl groups or nitro groups, such as xylenes, chlorobenzene, o-dichlorobenzene or nitrobenzene, prove to be particularly suitable, as do pyridine bases, such as pyridine, picoline or quinoline, and also ketones, such as cyclohexanone, ethers, such as ethylene glycol monomethyl ether or monoethyl ether, and amides, such as dimethylformamide or N-methylpyrrolidone.

Finally, the coupling can also be carried out by suspending the amine which is to be diazotised together with the coupling component, in the molar ratio of 2:1, in an organic solvent and treating the suspension with a diazotising agent, especially an ester of nitrous acid, such as methyl nitrite, ethyl nitrite, butyl nitrite, amyl nitrite or octyl nitrite.

The new colorants are valuable pigments which can be used, in a finely divided form, for pigmenting high molecular organic material, for example cellulose ethers and cellulose esters, high molecular polyamides and high molecular polyurethanes or polyesters, acetylcellulose, nitrocellulose, natural resins or synthetic resins, such as polymerisation resins or condensation resins, for example aminoplasts, in particular urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, thermoplastic or curable acrylic resins, rubber, casein, silicone and silicone resins, individually or as mixtures. It is immaterial whether the high molecular compounds mentioned are in the form of plastic masses or melts or in the form of spinning solutions, lacquers or paints. The new pigments prove to be particularly suitable for printing inks. Depending on the application, it proves advantageous to use the new pigments as toners or in the form of preparations. The preparations can for example contain, alongside the pure pigment, natural resins, for example abietic acid or its esters, ethylcellulose, cellulose acetobutyrate, alkaline earth metal salts of higher fatty acids, fatty amines, for example stearylamine or rosinamine, vinyl chloride/vinyl acetate copolymers, polyacrylonitrile or polyterpene resins or water-soluble dyestuffs, for example dyestuff-sulphonic acids or their alkaline earth metal salts. The colourations obtained with the new colorants are distinguished by good fastness to light, to weather and to migration, last even following exposure to heat, great depth of colour, brilliance, dispersibility and heat stability.

Depending on the particle size and particle size distribution, highly transparent to very opaque colourations can be obtained with the pigments according to the invention in a great diversity of substrates. If the pigments are obtained in a form which is too finely granular, they can be converted to a coarser form, with improved hiding power, by recrystallisation in an aqueous and/or organic medium, for example in organic solvents, as a rule by a heat treatment, for example at temperatures between 160° and 300° C and, if appropriate, under elevated pressure. On the other hand, excessively coarse pigments can be converted to a finely granular, transparent form by suitable comminution measures, for example by wet grinding processes or dry grinding processes.

In the examples which follow the parts, unless otherwise stated, denote parts by weight and the percentages denote percentages by weight.

EXAMPLE 1

47.2 parts of 1-amino-2-chloro-5-methoxy-4-acetylaminobenzene are dissolved in 1,500 parts by volume of glacial acetic acid at room temperature. The light yellow solution is stirred with 60 parts by volume of concentrated hydrochloric acid, the mixture is cooled to 6° C, 60 parts by volume of 4N sodium nitrite solution are added dropwise over the course of 10 minutes and the resulting diazo solution is clarified by filtration. The filtrate is brought to pH 4 by addition of 50 parts of 60% strength sodium acetate.

At the same time, 34 parts of 2-methyoxy-5-chloro-1,4-bis-acetoacetylaminobenzene are dissolved in 2,000 parts of water by addition of 30 parts by volume of 40% strength sodium hydroxide solution. After addition of 2 parts of kieselguhr the resulting suspension is clarified by filtration and the residue is rinsed with 70 parts by volume of water. A clear light yellow solution is thus obtained, to which the diazo solution is added dropwise at 5° C over the course of 20 minutes. This produces a yellow precipitate. The suspension obtained is heated to 75° C over the course of one hour and filtered hot. The residue is washed until free from salt and dried in vacuo at 60° C. 78 parts, corresponding to 97% of theory, of a yellow pigment of the formula

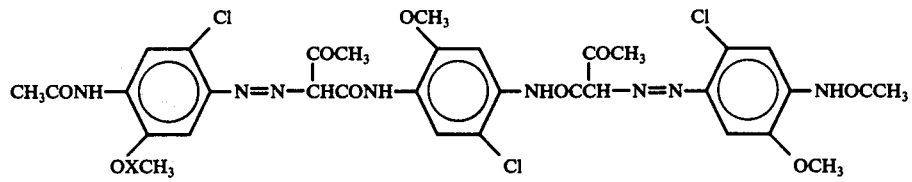

are obtained.

If this pigment is after-treated in dimethylformamide (one hour at 140° C) and milled into polyvinyl chloride, fast yellow colourations are obtained.

The table which follows describes further colorants which are obtained by coupling the diazotized bases of Column I with the bis-acetoacetic acid arylides of the diamines of Column II. Column III indicates the colour shade of a PVC film coloured with 0.2% of this pigment.

| Example | I | II | III |
|---|---|---|---|
| 2 | 1-amino-3-acetylamino-benzene | 2-chloro-5-methoxy-1,4-phenylenediamine | yellow |
| 3 | 1-amino-2-chloro-5-acetylamino-benzene | 2-chloro-5-methoxy-1,4-phenylenediamine | " |
| 4 | 1-amino-2-methyl-5-acetylamino-benzene | 2-chloro-5-methyl-2,4-phenylenediamine | " |
| 5 | 1-amino-2-methoxy-5-acetylamino-benzene | 1,4-phenylenediamine | " |
| 6 | 1-amino-4-methyl-5-acetylamino-benzene | 2,5-dichloro-1,4-phenylenediamine | " |
| 7 | 1-amino-4-methoxy-5-acetylamino-benzene | 2,5-dimethyl-1,4-phenylenediamine | orange |
| 8 | 1-amino-4-ethoxy-5-acetylamino-benzene | 1,3-phenylenediamine | light yellow |
| 9 | 1-amino-2-methoxy-5-propionylamino-benzene | 2,5-dimethoxy-1,4-phenylenediamine | brown-yellow |
| 10 | 1-amino-2-chloro-5-propionylamino-benzene | 2-methoxy-1,4-phenylenediamine | yellow |
| 11 | 1-amino-4-acetylamino-benzene | 2-chloro-5-methoxy-1,4-phenylenediamine | " |
| 12 | 1-amino-2-chloro-4-acetylamino-benzene | 2-chloro-5-methyl-1,4-phenylenediamine | " |
| 13 | 1-amino-2-methyl-4-acetylamino-benzene | 2,5-dimethyl-1,4-phenylenediamine | brown-yellow |
| 14 | 1-amino-2-methoxy-4-acetylamino-benzene | 1,3-phenylenediamine | yellow |
| 15 | 1-amino-2-nitro-4-acetylamino-benzene | 2-chloro-1,4-phenylenediamine | " |
| 16 | 1-amino-3-chloro-4-acetylamino-benzene | 2,5-dimethoxy-1,4-phenylenediamine | " |
| 17 | 1-amino-3-methoxy-4-acetylamino-benzene | 1,4-phenylenediamine | reddish-tinged yellow |
| 18 | 1-amino-3-cyano-4-acetylamino-benzene | 2-chloro-5-methoxy-1,4-phenylenediamine | yellow |
| 19 | 1-amino-3-methyl-4-acetylamino-benzene | 1,4-phenylenediamine | " |
| 20 | " | 2-chloro-5-methoxy-1,4-phenylenediamine | " |
| 21 | 1-amino-2-chloro-4-propionylamino-benzene | 2-chloro-5-methoxy-1,4-phenylenediamine | brown-yellow |
| 22 | 1-amino-2-methyl-4-butyrylamino-benzene | 1,4-phenylenediamine | yellow |
| 23 | 1-amino-2-methoxy-3-acetylamino-benzene | 2-chloro-5-methoxy-1,4-phenylenediamine | yellow |
| 24 | 1-amino-2-chloro-3-acetylamino-benzene | " | " |
| 25 | 1-amino-2,5-dichloro-4-acetylamino-benzene | 1,4-phenylenediamine | light yellow |
| 26 | 1-amino-2,5-dichloro-4-acetylamino-benzene | 2-chloro-5-methoxy-1,4-phenylenediamine | yellow |
| 27 | " | 2,5-dimethoxy-1,4-phenylenediamine | orange |
| 28 | 1-amino-2,5-dimethyl-4-acetylamino-benzene | 1,4-phenylenediamine | brown |
| 29 | " | 2-chloro-1,4-phenylenediamine | yellow |
| 30 | " | 2-chloro-5-methoxy-1,4-phenylenediamine | orange |
| 31 | " | 2,5-dimethyl-1,4-phenylenediamine | brown |
| 32 | 1-amino-2,5-dimethoxy-4-acetylamino-benzene | 1,4-phenylenediamine | orange |
| 33 | " | 2-chloro-1,4-phenylenediamine | " |
| 34 | " | 2,5-dichloro-1,4-phenylenediamine | " |
| 35 | " | 2-chloro-5-methyl-1,4-phenylenediamine | claret |
| 36 | " | 1,3-phenylenediamine | " |
| 37 | 1-amino-2,5-diethoxy-4-acetylamino-benzene | 1,4-phenylenediamine | brown |
| 38 | " | 1,3-phenylenediamine | " |
| 39 | 1-amino-3,5-dichloro-4-acetylamino-benzene | 2-chloro-5-methoxy-1,4-phenylenediamine | brown |
| 40 | 1-amino-2-methyl-5-chloro-4-acetylamino-benzene | 1,4-phenylenediamine | yellow |
| 41 | " | 2-chloro-5-methyl-1,4-phenylenediamine | " |
| 42 | 1-amino-2-chloro-5-methyl-4-acetylamino-benzene | " | yellow |
| 43 | 1-amino-2-chloro-5-methoxy-4-acetylamino-benzene | 1,4-phenylenediamine | " |
| 44 | 1-amino-2-chloro-5-methoxy-4-acetylamino-benzene | 2-methoxy-1,4-phenylenediamine | " |
| 45 | " | 2,5-dimethoxy-1,4-phenylenediamine | claret |
| 46 | " | 2-chloro-5-methyl-1,4-phenylenediamine | yellow |
| 47 | 1-amino-2-methoxy-5-(o-chlorobenzoylamino)-benzene | 2-chloro-5-methoxy-1,4-phenylenediamine | " |
| 48 | 1-amino-2-methoxy-5-methyl-4-acetylamino-benzene | 1,4-phenylenediamine | " |
| 49 | 1-amino-2-methoxy-5-nitro-4-acetylamino-benzene | 1,4-phenylenediamine | " |
| 50 | 1-amino-2-methoxy-5-chloro-4- | 2-chloro-5-methoxy-1,4- | " |

-continued

| Example | I | II | III |
|---|---|---|---|
| | propionylamino-benzene | phenylenediamine | |
| 51 | 1-amino-2-chloro-4-methyl-5-acetylamino-benzene | 2-chloro-5-methoxy-1,4-phenylenediamine | yellow |
| 52 | 1-amino-2-acetylamino-benzene | " | " |
| 53 | 1-amino-2-propionylamino-benzene | 2-chloro-5-methyl-1,4-phenylenediamine | " |
| 54. | 1-amino-5-methyl-2-acetylamino-benzene | " | " |
| 55 | 1-amino-5-methoxy-2-acetylamino-benzene | 2-methoxy-1,4-phenylenediamine | " |
| 56 | 1-amino-5-trifluoromethyl-2-acetylamino-benzene | 2-chloro-5-methoxy-1,4-phenylenediamine | " |
| 57 | 1-amino-5-chloro-2-acetylamino-benzene | " | " |
| 58 | 1-amino-4-chloro-2-acetylamino-benzene | " | " |
| 59 | 1-amino-4-methyl-2-acetylamino-benzene | 2,5-dimethoxy-1,4-phenylenediamine | orange |
| 60 | 1-amino-4-methoxy-2-acetylamino-benzene | 2,5-dimethyl-1,4-phenylenediamine | " |
| 61 | 1-amino-3-chloro-2-acetylamino-benzene | 2-chloro-5-methoxy-1,4-phenylenediamine | yellow |
| 62 | 1-amino-4,5-dichloro-2-acetylamino-benzene | " | " |
| 63 | 1-amino-4-chloro-5-methoxy-2-acetylamino-benzene | 2-chloro-5-methoxy-1,4-phenylenediamine | yellow |
| 64 | 1-amino-2,5-diacetylamino-benzene | " | " |
| 65 | 1-amino-2-methoxy-5-(2'-chlorobenzoylamino)-benzene | 2-chloro-5-methyl-1,4-phenylenediamine | " |
| 66 | | 1,4-phenylenediamine | " |
| 67 | 1-amino-2-methoxy-5-benzoylaminobenzene | 2-chloro-5-methoxy-1,4-phenylenediamine | " |
| 68 | " | 2-chloro-5-methyl-1,4-phenylenediamine | " |
| 69 | " | 1,4-phenylenediamine | " |
| 70 | " | 2-chloro-1,4-phenylenediamine | green-yellow |
| 71 | 1-amino-2-methoxy-5-(4'-chlorobenzoylamino)-benzene | 2-chloro-5-methoxy-1,4-phenylenediamine | yellow |
| 72 | " | 2-chloro-5-methyl-1,4-phenylenediamine | " |
| 73 | " | 1,4-phenylenediamine | " |
| 74 | 1-amino-2-methoxy-5-(2',4'-dichlorobenzoylamino)-benzene | 2-chloro-5-methoxy-1,4-phenylenediamine | " |
| 75 | " | 2-chloro-5-methyl-1,4-phenylenediamine | " |
| 76 | 1-amino-2-methoxy-5-(2',4' dichlorobenzoylamino)-benzene | 1,4-phenylenediamine | yellow |
| 77 | 1-amino-2-methoxy-5-(2',5'-dichlorobenzoylamino)-benzene | 2-chloro-5-methoxy-1,4-phenylenediamine | " |
| 78 | 1-amino-2-methoxy-5-methyl-4-benzoylaminobenzene | 2-chloro-5-methyl-1,4-phenylenediamine | " |
| 79 | " | 1,4-phenylenediamine | " |
| 80 | " | 2,5-dichloro-1,4-phenylenediamine | " |
| 81 | 1-amino-2-methoxy-5-chloro-4-benzoylaminobenzene | 2-chloro-5-methoxy-1,4-phenylenediamine | " |
| 82 | " | 2-chloro-5-methyl-1,4-phenylenediamine | " |
| 83 | 1-amino-2,5-dimethoxy-4-benzoylaminobenzene | 2-chloro-5-methoxy-1,4-phenylenediamine | orange |
| 84 | " | 2-chloro-5-methyl-1,4-phenylenediamine | " |
| 85 | 1-amino-2,5-diethoxy-4-benzoylaminobenzene | 2-chloro-5-methoxy-1,4-phenylenediamine | " |
| 86 | " | 2-chloro-5-methyl-1,4-phenylenediamine | " |
| 87 | " | 1,4-phenylenediamine | " |
| 88 | 1-amino-2,5-diethoxy-4-(2'-chlorobenzoylamino)-benzene | 2-chloro-5-methoxy-1,4-phenylenediamine | orange |
| 89 | " | 2-chloro-5-methyl-1,4-phenylenediamine | " |
| 90 | " | 1,4-phenylenediamine | " |
| 91 | 1-amino-2,5-diethoxy-4-(2',4'-dichlorobenzoylamino)-benzene | 2-chloro-5-methocy-1,4-phenylenediamine | red-orange |
| 92 | " | 2-chloro-5-methyl-1,4-phenylenediamine | " |
| 93 | " | 1,4-phenylenediamine | orange |
| 94 | 1-amino-2-nitro-4-benzoylaminobenzene | 2-chloro-5-methoxy-1,4-phenylenediamine | orange |
| 95 | " | 2-chloro-5-methyl-1,4-phenylenediamine | " |
| 96 | " | 1,4-phenylenediamine | " |
| 97 | 1-amino-2,5-diethoxy-4-phenacetylaminobenzene | 2-chloro-5-methoxy-1,4-phenylenediamine | yellow-orange |
| 98 | " | 2-chloro-5-methyl-1,4-phenylenediamine | " |
| 99 | 1-amino-2,5-diethoxy-4-phenoxyacetylaminobenzene | 2-chloro-5-methoxy-1,4-phenylenediamine | " |
| 100 | " | 2-chloro-5-methyl-1,4-phenylenediamine | " |
| 101 | 1-amino-2,5-diethoxy-4-phenoxyacetylaminobenzene | 1,4-phenylenediamine | yellow-orange |

-continued

| Example | I | II | III |
|---|---|---|---|
| 102 | 1-amino-2,5-diethoxy-4-(2'-chlorophenoxyacetylamino)-benzene | 2-chloro-5-methoxy-1,4-phenylenediamine | " |
| 103 | " | 2-chloro-5-methyl-1,4-phenylenediamine | " |
| 104 | " | 1,4-phenylenediamine | " |
| 105 | 1-amino-2,5-diethoxy-4-(4'-chlorophenoxyacetylamino)-benzene | 2-chloro-5-methoxy-1,4-phenylenediamine | " |
| 106 | " | 2-chloro-5-methyl-1,4-phenylenediamine | " |
| 107 | " | 1,4-phenylenediamine | " |
| 108 | 1-amino-2,5-diethoxy-4-(2',4'-dichlorophenoxyacetylamino)-benzene | 2-chloro-5-methoxy-1,4-phenylenediamine | orange |
| 109 | " | 2-chloro-5-methyl-1,4-phenylenediamine | " |
| 110 | " | 1,4-phenylenediamine | " |
| 111 | 1-amino-2,5-diethoxy-4-(2'-furoylamino)benzene | 2-chloro-5-methoxy-1,4-phenylenediamine | yellow-orange |
| 112 | 1-amino-2,5-diethoxy-4-phenylthioacetylaminobenzene | 2-chloro-5-methoxy-1,4-phenylenediamine | " |
| 113 | " | 2-chloro-5-methyl-1,4-phenylenediamine | " |
| 114 | 1-amino-3-chloro-4-acetylamino-benzene | 2,5-dimethyl-1,4-phenylenediamine | yellow |
| 115 | " | 2-methyl-5-chloro-1,4-phenylenediamine | " |
| 116 | " | 2-methoxy-5-chloro-1,4-phenylenediamine | " |
| 117 | 1-amino-2-chloro-5-methyl-4-acetylaminobenzene | 2-methyl-5-chloro-1,4-phenylenediamine | " |
| 118 | 1-amino-2,5-diethoxy-4-(4'-methyl-phenoxyacetylamino)-benzene | 2,5-diethoxy-1,4-phenylenediamine | orange |
| 119 | 1-amino-5-chloro-2-methoxy-4-acetylaminobenzene | 1,3-phenylenediamine | yellow |
| 120 | " | 1,4-phenylenediamine | " |
| 121 | " | 2,5-dimethyl-1,4-phenylenediamine | red-yellow |
| 122 | " | 2-methyl-5-chloro-1,4-phenylenediamine | yellow |
| 123 | " | 2,5-dichloro-1,4-phenylenediamine | green-yellow |
| 124 | " | 2-methoxy-5-chloro-1,4-phenylenediamine | yellow |
| 125 | 1-amino-2-chloro-5-methyl-4-(3',5'-dichloro-4'-hydroxybenzoylamino)-benzene | 2-methyl-5-chloro-1,4-phenylenediamine | yellow |
| 126 | 1-amino-2-chloro-5-methyl-4-(3',5'-dibromo-4'-hydroxy-benzoylamino)-benzene | 2-methyl-5-chloro-1,4-phenylenediamine | yellow |
| 127 | 1-amino-4-(3',5'-dichloro-6'-hydroxy-benzoylamino)-benzene | " | " |
| 128 | 1-amino-2,5-dichloro-4-(2'-hydroxy-benzoylamino)-benzene | " | " |
| 129 | 1-amino-2-chloro-5-benzoylamino-benzene | 2,5-dimethyl-1,4-phenylene diamine | light yellow |

EXAMPLE 130

2 g of the pigment prepared according to Example 1 are ground with 36 g of hydrated aluminium oxide, 60 g of a linseed oil varnish of medium viscosity and 2 g of cobalt linoleate on a triple roll mill. The yellow prints produced with the resulting colour paste are deeply coloured and have outstanding fastness to light.

EXAMPLE 131

0.6 g of the pigment prepared according to Example 1 are mixed with 67 g of polyvinyl chloride, 33 g of dioctyl phthalate, 2 g of dibutyl-tin dilaurate and 2 g of titanium dioxide and converted to a thin film on a roll mill over the course of 15 minutes at 160° C. The yellow colouration thus produced is deep and fast to migration, heat and light.

EXAMPLE 132

10 g of titanium dioxide and 2 g of the pigment prepared according to Example 1 are ground with 88 g of a mixture of 26.4 g of coconut alkyd resin, 24.0 g of melamineformaldehyde resin (50% solids content), 8.8 g of ethylene glycol monomethyl ester and 28.8 g of xylene for 48 hours in a ball mill.

If this lacquer is sprayed onto an aluminium foil, predried for 30 minutes at room temperature and then stoved for 30 minutes at 120° C, a yellow lacquering is obtained, which has good depth of colour and is distinguished by very good fastness to overlacquering, light and weathering.

EXAMPLE 133

3.2 parts of 1-amino-4-acetylamino-benzene and 3.1 parts of 2,5-dimethyl-1,4-bis-acetoacetylamino-benzene are dissolved in 200 parts of dichlorobenzene and 50 parts of glacial acetic acid at 50° C. After cooling to room temperature, 2.5 parts of tert.-butyl nitrite in 100 ml of dichlorobenzene are added dropwise over the course of 15 minutes, during which the temperature rises to 40° C and the pigment formation starts.

The mixture is then stirred for 2 hours at 40°-50° C and 18 hours at 103°-140° C. The colorant assumes a uniformly crystalline form. Orange crystalline aggregates of 10 – 20 μ length are detectable under the microscope. The produce is filtered off at 140° C and washed with hot dichlorobenzene until the filtrate emerges colourless, the dichlorobenzene is displaced by methanol and the product is finally washed with hot water.

After drying, 5.5 parts of an orange-yellow colorant of the formula

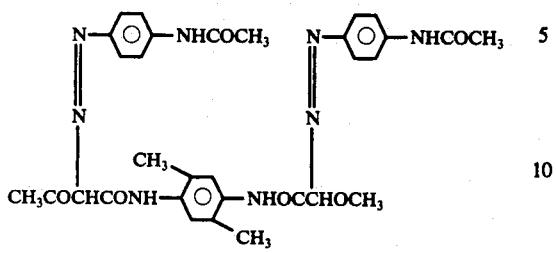

are obtained.

The pigment thus prepared is outstandingly suitable for the production of printing inks, having good flow, for the graphic trade, and gives very deep, pure yellow prints of good gloss and transparency.

The treatment in the organic solvent can also be carried out directly with the moist filter cake without prior drying. Thus, the moist press cake can be stirred in picoline at 100°–120° C, filtered off and washed with methanol and subsequently with dilute hydrochloric acid or the moist press cake is stirred into chlorobenzene, o-dichlorobenzene or nitrobenzene, freed from water by azeotropic distillation and then worked up as described above.

We claim:

1. A disazo pigment of the formula

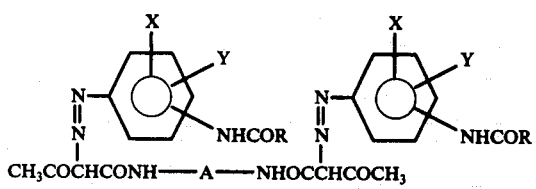

wherein A denotes a group of the formula

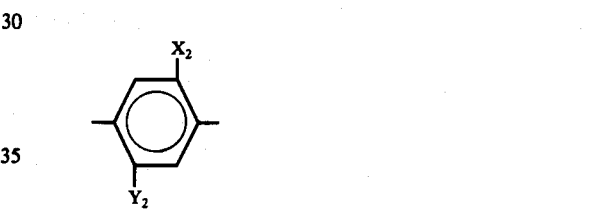

wherein $X_1$ and $Y_1$ denote hydrogen, halogen, alkyl containing 1 to 4 carbon atoms, alkoxy containing 1 to 4 carbon atoms, phenoxy, trifluoromethyl, nitro, cyano, or alkoxycarbonyl containing 2 to 5 carbon atoms, or naphthylene; X denotes hydrogen, alkyl containing 1 to 4 carbon atoms, alkoxy containing 1 to 4 carbon atoms, nitro, cyano, alkoxycarbonyl containing 2 to 5 carbon atoms, or alkanoylamino containing 2 to 5 carbon atoms; Y denotes hydrogen, halogen, alkyl containing 1 to 4 carbon atoms, or alkoxy containing 1 to 4 carbon atoms; and R denotes alkyl containing 1 to 6 carbon atoms.

2. A disazo pigment according to claim 1, wherein the -NHCOR group is in the para-position to the azo group.

3. A disazo pigment according to claim 1, wherein the -NHCOR group is in the meta-position to the azo group.

4. A disazo pigment according to claim 1 wherein A denotes a radical of the formula

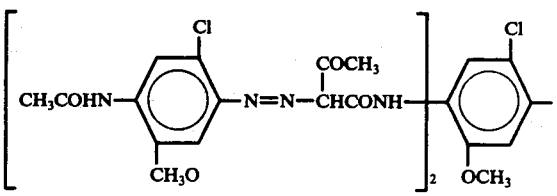

wherein $X_2$ and $Y_2$ denote hydrogen, chloro, alkyl containing 1–4 C atoms or alkoxy containing 1–4 C atoms.

5. The compound according to claim 1 of the formula

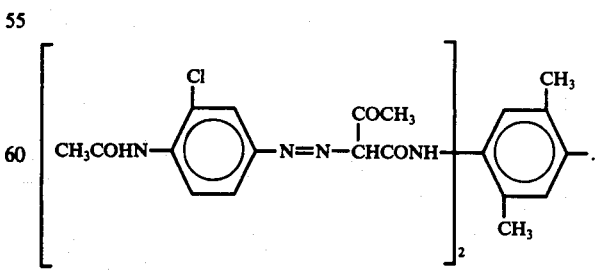

6. The compound according to claim 1 of the formula